2,792,311

PLASTIC CHROME RAMMING MIXES

Ben Davies, Pittsburgh, Pa., assignor to Harbison-Walker Refractories Co., Pittsburgh, Pa., a corporation of Pennsylvania No Drawing. Application October 17, 1955, Serial No. 541,080

10 Claims. (Cl. 106—66)

The term "plastic chrome ramming mix" is used in the refractory trade to refer to wet, plastic, unfired refractory mixes composed predominantly of natural chrome ore and which contain bonding and plasticizing agents.

Such plastic chrome ramming mixes are used for application to, for example, furnace doors, walls, and bottoms, and between and around boiler tubes, and after application by ramming or tamping, the mix is burned in situ by the furnace heat into a monolithic refractory. For these purposes it is necessary that the mix be soft and workable so that it can easily be pounded or rammed into place. When a plastic chrome ramming mix is initially made it is normally soft and workable. However, as a practical matter it is often necessary for these mixes to be stored for extended periods before being installed in a furnace. Experience has shown that when the plastic chrome ore ramming mixes heretofore commercially available are stored they will commonly stiffen and harden in a short time to an extent such that the mixes are no longer useful for their intended purpose.

Chrome ore has little plasticity and essentially no dry bonding strength, and it is for this reason that bonding and plasticizing agents form a part of these mixes. The materials commonly used to impart plasticity and dry strength to these chrome ramming mixes are plastic clays, such as ball clay, and sodium silicate. The mix when brought to suitable plasticity with water is packed in metal drums having tight-fitting lids intended to prevent drying out, but even when stored in this manner the aforementioned stiffening will commonly occur upon storage. The exact mechanism of this stiffening phenomenon is not fully understood although it is thought to result from some sort of reaction between sodium silicate and impurities generally present in plastic clays.

A primary object of this invention is to provide plastic chrome ramming mixes having satisfactory plasticity and working properties that are not adversely affected upon extended storage and which thus suppress the disadvantage alluded to above of stiffening upon storage.

A further object is to provide plastic chrome ramming mixes embodying the foregoing object and which may be produced economically by procedures requiring no substantial alteration of existing production methods and with use of apparatus used heretofore for such purposes.

Yet another object is to provide such plastic chrome ramming mixes the refractoriness of which may be modified for the various purposes to which such mixes are put.

Other objects will appear from the following specification.

This invention is predicated upon my discovery that its stated objects are attained by the inclusion of bentonite clay and a small amount of ethylenediamine tetraacetic acid (referred to hereinafter for brevity as EDTA) in a plastic chrome ramming mix composed of refractory chrome ore and sodium silicate. In this way, I provide plastic chrome ore ramming mixes of satisfactory plasticity and workability that will retain their softness and plasticity during extended storage in sealed containers.

Salts of EDTA, such as the various sodium or other alkali metal salts, act similarly to the acid itself for the purposes of this invention. However, the effect of such salts is actually due to EDTA, the salts only affording solubility in water and a source of the acid. Consequently when an amount of EDTA is specified therein and in the appended claims its source may be the acid itself, or it may be supplied by an amount of one of its salts such as to provide an equivalent amount of the acid. In most instances the tetrasodium salt of EDTA has been found satisfactory as it is very soluble in water and thus can be conveniently added to the batch as a solution when manufacturing the plastic chrome ramming mix.

The unusual effectiveness of EDTA in keeping plastic chrome ramming mixes soft and plastic after extended storage appears to be peculiar to chrome ramming mixes containing bentonite clays. Thus, experience has shown that the addition of the tetrasodium salt of EDTA to plastic chrome ore ramming mixes containing other types of plastic clays, such as ball clays, and no bentonite, has no beneficial effect. The reason why the action of EDTA maintains the plasticity of mixes made with bentonite clays but does not affect other types of plastic clays is neither known nor understood. Thus, EDTA and its salts are non-hygroscopic so that the action of EDTA in the mixes of this invention is not due to the ability to pick up or retain water. Furthermore, EDTA and its salts have very slight deflocculating or thinning action on clays so that their action in these mixes cannot be ascribed to such a function. Actually, the plastic flow properties of the ramming mixes of this invention is not appreciably different than that of plastic chrome ramming mixes without it.

As will be understood, chrome ore forms the base of these mixes and constitutes at least 50 percent of them. It may be said that the invention applies to refractory chrome ores as a class since a wide variety of chrome ores can be used. For many purposes it is preferred to use a refractory ore typified by Philippine chrome ore, a typical analysis of which is as follows:

| | Percent |
|---|---|
| Silica ($SiO_2$) | 5.0 |
| Alumina ($Al_2O_3$) | 29.6 |
| Iron oxide (FeO) | 12.9 |
| Chromic oxide ($Cr_2O_3$) | 32.5 |
| Lime (CaO) | 0.5 |
| Magnesia (MgO) | 17.8 |
| Ignition loss | 0.9 |

Other chrome ores of different analyses having lower or higher refractoriness may be used, of course, either alone or in admixture, depending upon the properties required in the ramming mix.

The bentonite clay used in the plastic chrome ramming mixes of this invention is a product of the natural weathering of volcanic ash, and it is composed primarily of clay minerals of the montmorillonite type. For many purposes it is preferred that the bentonite constitute about 3 percent by weight of the mix. If greater refractoriness is desired and a higher degree of plasticity is not needed, the percentage of bentonite can be reduced to about 1 percent by weight. On the other hand, when greater plasticity and dry strength are required, the percentage by weight of bentonite may be as much as about 5 percent but with some sacrifice of refractoriness although refractoriness is not a prime requisite for all purposes.

Preferably, the bentonite or montmorillonite type clay used in the practice of this invention is in a fine state of subdivision, e. g., such that the preponderance of it will pass a 200-mesh screen. A typical analysis of a bentonite clay suited to the purposes of this invention is as follows:

| | Percent |
|---|---|
| Silica ($SiO_2$) | 64.3 |
| Alumina ($Al_2O_3$) | 20.7 |
| Iron oxide ($Fe_2O_3$) | 3.0 |
| Iron oxide (FeO) | 0.5 |
| Lime (CaO) | 0.5 |
| Magnesia (MgO) | 2.3 |
| Soda ($Na_2O$) | 2.6 |
| Potash ($K_2O$) | 0.4 |
| Loss on ignition | 5.1 |

As indicated above, sodium silicate is added to plastic chrome ramming mixes as a plasticizer and to confer dry strength. Preferably it is supplied to the batch as liquid sodium silicate containing about 53 percent of water and having a $Na_2O:SiO_2$ ratio of 1:2.4. For many purposes such a sodium silicate constitutes about 7 percent by weight of the batch. When the highest refractoriness of the mix is desired and high molded or handling strength is less essential, the percentage of sodium silicate solution can be reduced to as little as 3 percent by weight. On the other hand, if high molded strength is desired the percentage of liquid sodium silicate can be raised to about 10 percent. Other ratios of $Na_2O:SiO_2$ and other concentrations of liquid sodium silicate may, of course, be used. Likewise, solid silicate may be used by having enough water in the mix to dissolve it.

The amount of EDTA used in the mix is primarily dependent upon the quantity and type of bentonite used. Experience has shown that at little as 0.05 percent by weight of the batch exerts an observable improvement in storage and that with bentonite of the type indicated above more than about 1 percent by weight does not appreciably improve the storage properties. Likewise, I now believe that the EDTA is most effective when its ratio to bentonite is within the limits of 0.019:1 to 0.3:1, and excellent results have been obtained with the ratio about 0.1:1. These limits may be widened when more impure forms of bentonite are used than that of which an analysis is given above.

Thus, if due to the use of bentonites containing larger amounts of impurities the mixes tend to stiffen in storage, that undesirable result can be avoided by using larger percentages of EDTA than just stated.

Thus in its broader aspects the mixes according to the invention are, by weight:

| | |
|---|---|
| Bentonite | 1–5%. |
| Liquid sodium silicate | 3–10%. |
| EDTA | 0.0375–1.0%. |
| Chrome ore | Remainder. |
| $H_2O$ | To give workability. |

The EDTA can be added to the batch in various ways. Thus, the acid, which is relatively insoluble in water, can be added as a dry powder. It is more convenient, however, to use the soluble alkali metal salts of the acid, such as the tetra-, tri- or disodium salts. These may be added as powders or in water solution. Likewise, the ammonium salts of EDTA may be used.

The mixes can be prepared in various ways customary in the trade in making plastic ramming mixes. The chrome ore may be in lump form to which there are then added the bentonite, sodium silicate and the EDTA, the entire batch being then mixed and ground in a wet pan to the desired degree of fineness and workability. Or, the chrome ore can be initially crushed and ground and the batch then mixed without further grinding to the desired degree of workability. The crushed and ground chrome ore may be sized by screening into several grain size fractions or ranges which are remixed in chosen amounts to give any desired gradation.

The amount of water to be added is not critical. It will depend upon such factors as the amount of liquid sodium silicate used, upon whether or not the EDTA is supplied as a solution of one of its salts, and upon the degree of workability desired, as well as upon the particular bentonite used. In general, satisfactory results are to be had with a total moisture supplied from all batch ingredients of about 8 pounds per 100 pounds of dry ingredients.

As an example, a plastic chrome ramming mix which has been found to be highly plastic, to have good refractoriness, and good ability to be stored for extended periods without stiffening is made from the following ingredients:

| | Percent |
|---|---|
| Lump Philippine chrome ore | 89.7 |
| Liquid sodium silicate | 7.0 |
| Bentonite | 3.0 |
| Ethylenediamine tetraacetic acid added as the tetrasodium salt of ethylenediamine tetraacetic acid | 0.3 |
| | 100.0 |
| Water | 4 to 5 |

These materials are crushed and uniformly and thoroughly mixed in a wet pan until the desired degree of fineness is reached. The amount of water will determine the softness of the mix.

Softness or workability index is measured by Military Specification MIL–P–15384B, which represents a slight modification of the ASTM method C181. Briefly, this workability index is a measure of the plastic deformation of a molded test specimen when subjected to impacts; the larger the workability index, the softer the test specimen. Measurements of the workability index after successive periodic intervals of storage gives a measure of the rate of stiffening in storage. An ideal workability index, measured by the Military Specification method, is between 20 and 30, in which range the plastic chrome ramming mix can be worked easily.

Customarily these mixes are made at a workability index higher than the desired range, as it is characteristic of them to show their largest drop in workability index during the first week of storage. The mix just described was manufactured with a workability index of 45. After one week of storage the workability index had dropped to 30. Three months later it was 29, and after six months' storage it was 25 and thus midway of the ideal range. Plastic chrome ramming mixes made without the combination of bentonite and EDTA will commonly be unworkable after even short periods of storage. The foregoing mix also had a high degree of refractoriness as evidenced by the fact that a truncated pyramid heated for five hours at 2910° F. showed but 8.1 percent deformation.

The amount of EDTA that is added to the plastic chrome ramming mix will affect the storage characteristics of this material. To demonstrate this a series of plastic chrome ramming mixes was made containing various percentages of EDTA. These mixes contained Philippine chrome ore, 7 percent sodium silicate, 3 percent bentonite and EDTA, added as the tetrasodium salt of the acid in amounts equivalent to 0.0 percent, 0.03075 percent, 0.075 percent, 0.15 percent, 0.225 percent and 0.30 percent of the acid.

Prior to the manufacture of these plastic chrome ramming mixes the Philippine chrome ore was crushed, ground and separated into various sized fractions. The individual sized fractions in the desired amounts were thoroughly mixed with the other components of the batch, and the correct amount of water was added so that all the batches in the series had a workability index of 45 when made. The workability index of the mixes after various lengths of storage in sealed containers was:

| Ethylenediamine tetraacetic acid added as tetrasodium salt of ethylenediamine tetraacetic acid, percent | 0.00 | 0.0375 | 0.075 | 0.15 | 0.225 | 0.3 |
|---|---|---|---|---|---|---|
| Ratio: ethylenediaminetetraacetic acid: bentonite | 0.00 | 0.0125 | 0.025 | 0.05 | 0.075 | 0.10 |
| Workability index: | | | | | | |
| 1. As made | 45 | 45 | 45 | 45 | 45 | 45 |
| 2. After 1 week storage | 14 | 18 | 26 | 36 | 38 | 38 |
| 3. After 3 weeks' storage | 13 | 14 | 21 | 32 | 35 | 32 |
| 4. After 6 weeks' storage | 13 | 13 | 18 | 31 | 31 | 29 |

As mentioned previously, a workability index lower than 20 is outside the desired range. The data above show that when no EDTA is added to the mix it stiffens very rapidly. However, by the addition of as little as 0.0375 percent EDTA a small but observable effect on the storage properties can be noted, and as the percentage addition is increased to 0.15 percent the beneficial effect on the storage properties is striking. A product with a workability index below 15 would be wholly unsuited for many uses. Products with an index of 15 or greater are to be had, according to my experience, with about 0.05 percent or more EDTA, or a ratio of EDTA to bentonite of about 0.019 or more.

In the examples given heretofore the EDTA was added to the mix as the tetrasodium salt of this acid. A similar desirable effect on the storage properties of the plastic chrome ramming mix can be obtained by the addition of the acid itself to the mix, or by the addition of other salts containing the EDTA.

For example plastic chrome ramming mixes were made from the following compositions:

| Mix Designation | A | B | C | D |
|---|---|---|---|---|
| Philippine Chrome Ore | 89.61 | 89.61 | 89.61 | 89.61 |
| Bentonite | 3.0 | 3.0 | 3.0 | 3.0 |
| Sodium Silicate | 7.0 | 7.0 | 7.0 | 7.0 |
| EDTA added as: | | | | |
| Ethylenediamine tetraacetic acid | 0.39 | | | |
| Tetrasodium salt of ethylenediamine tetraacetic acid | | 0.39 | | |
| Trisodium salt of ethylenediamine tetraacetic acid | | | 0.39 | |
| Disodium salt of ethylenediamine tetraacetic acid | | | | 0.39 |

The mixes were manufactured in the same manner as described above where the amount of EDTA was varied in the plastic chrome ramming mix.

The workability index of these mixes after various lengths of storage in sealed containers was:

| Mix Designation | A | B | C | D |
|---|---|---|---|---|
| Workability Index: | | | | |
| As made | 48 | 48 | 47 | 49 |
| After 1 week storage | 36 | 32 | 35 | 37 |
| After 3 weeks' storage | 31 | 29 | 32 | 33 |
| After 6 weeks' storage | 29 | 29 | 30 | 31 |

These results demonstrated that the effect of these compounds on improving the storage characteristics of plastic chrome ramming mixes is based on the EDTA.

Although for many purposes it is preferred that chrome ore constitute the only refractory constituent of these ramming mixes, as indicated above, it has been found that other refractory aggregates may with satisfaction replace a part of the chrome ore. Examples of such materials are artificial or natural spinels such as magnesium aluminate, magnesium chromite, magnesium ferrite, and magnetite. Other refractory materials may also be used to partially replace the natural chrome ore such, for example, as aluminum oxide, e. g., calcined aluminum oxide, calcined bauxite, or synthetic or natural aluminum hydrates. Such materials or aggregates should, of course, be inert, i. e., not react with or cause decomposition of sodium silicate to avoid an adverse effect upon the workability index during storage, and they should not exert any appreciable fluxing effect if they are not to lower refractoriness. When such materials are used to replace part of the chrome ore they will usually be used only up to about 35 percent of the mix.

As an example of this embodiment of the invention, a plastic chrome ramming mix was made of the following composition:

| | Percent |
|---|---|
| Philippine chrome ore | 76.7 |
| Calcined bauxite | 15.0 |
| Bentonite | 2.0 |
| Liquid sodium silicate | 6.0 |
| EDTA | 0.3 |

Not only did this mix have the storage properties that characterize this invention, but also it showed improved refractory quality as measured by the subsidence of a truncated pyramid heated five hours at 2910° F. The subsidence was only 2.3 percent as compared with a mix made wholly from the same chrome ore with the same amounts of bentonite, sodium silicate and EDTA, which had a subsidence of 5.3 percent in the same test.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A plastic chrome ore refractory ramming mix consisting essentially of at least about 50 percent chrome ore, about 3 to 10 percent of liquid sodium silicate, about 1 to 5 percent of bentonite, and about 0.05 to 1.0 percent of ethylenediamine tetraacetic acid.

2. A plastic chrome ore refractory ramming mix consisting essentially of, by weight, about 1 to 5 percent of bentonite, about 3 to 10 percent of liquid sodium silicate, and about 0.05 to 1.0 percent of ethylenediamine tetraacetic acid, and the remainder substantially all chrome ore.

3. A ramming mix according to claim 1 also containing up to about 34 percent of inert refractory aggregate as replacement for said chrome ore.

4. A ramming mix according to claim 1, said sodium silicate having a $Na_2O:SiO_2$ ratio of about 1:2.4.

5. A ramming mix according to claim 1, the ratio of said ethylenediamine tetraacetic acid to said bentonite being from about 0.019:1 to 0.3:1.

6. A plastic chrome ore refractory ramming mix consisting essentially of, by weight, more than about 50 percent of chrome ore, about 1 to 5 percent of bentonite, about 3 to 10 percent of sodium silicate, and about 0.05 to 1.0 percent of ethylenediamine tetraacetic acid, and the remainder not over about 34 percent of inert refractory aggregate other than said chrome ore, said bentonite preponderantly passing a 200-mesh screen.

7. A plastic chrome ore refractory ramming mix consisting essentially of, by weight, more than about 50 percent of chrome ore, about 1 to 5 percent of a clay composed essentially of montmorillonite type clay minerals, about 3 to 10 percent of sodium silicate, and about 0.05 to 1.0 percent of ethylenediamine tetraacetic acid, and the remainder substantially all inert refractory aggregate.

8. A plastic chrome ore refractory ramming mix according to claim 1, the ratio of ethylenediamine tetraacetic acid to bentonite being at least 0.019:1.

9. A plastic chrome ore refractory ramming mix according to claim 2, the ratio of ethylenediamine tetraacetic acid to bentonite being from about 0.019:1 to 0.3:1.

10. A plastic chrome ore refractory ramming mix according to claim 6, the ratio of ethylenediamine tetraacetic acid to bentonite being from about 0.019:1 to 0.3:1.

References Cited in the file of this patent

UNITED STATES PATENTS 2,499,445  Ammann  Mar. 7, 1950